2,894,848
JOINT SEALING COMPOUNDS CONTAINING ATTAPULGITE

Manfred E. Goodwin, Haddonfield, Edgar W. Sawyer, Jr., Metuchen, and Homer A. Smith, Berkeley Heights, N.J., assignors to Minerals & Chemicals Corporation of America, Menlo Park, N.J., a corporation of Maryland No Drawing. Application October 29, 1956
Serial No. 618,695

13 Claims. (Cl. 106—278)

The present invention relates to improved joint sealing or filling compounds of the type which must be substantially free from sag under the influence of heat. The invention particularly concerns improved bituminous joint sealing compounds such as, for example, the spot-weld sealers required by the automotive industry for sealing the spotweld seams between top and drip rail, between top assembly and side panel, between cowl and sides of automobile, etc. prior to painting the resulting welded structures and subsequently baking the paint or enamel thereon. Other joint filling compounds exemplary of the present invention are improved bituminous joint-fillers of the type introduced between road paving blocks or bricks and between sections of concrete pavements.

Automotive sealers, such as the aforesaid spotweld sealers, are employed to fill in and seal welded seams so that the seam will not leak moisture and will be protected from corrosion. The sealer should be of such composition that it will not bleed through subsequent paint films or alter the strength of the weld in any way, and it should have resistance to sag at paint baking temperatures. The term sag, as used in the joint sealing art, refers to the tendency of a sealer to flow. Paint or enamel baking temperatures in the automotive industry usually run from about 275° to about 400° F. and thus joint sealing compounds should not soften at these temperatures to the extent that they sag appreciably and thus tend to flow out of their seams.

A bituminous filler for pavement joints should be of such character as to adhere to the paving blocks or sections so that it does not loosen or chip in cold weather under the rigors imposed by traffic and contracting or settling pavement and it should not soften under high summer temperatures to the extent that it flows out of the joints.

Conventional bituminous fillers for pavement joints usually fall into one of three general types, viz.: bituminous material containing no extraneous mineral matter which is simply melted and poured into the joints; a grout filler which is a mechanical mixture of bituminous matter and either fine sand or finely divided mineral matter such as pulverized slate, limestone, or dolomite (grout fillers are poured while hot over the pavement and broomed or squeegeed into the joints); and premolded strips with or without a felted or woven fabric or metal reinforcement.

The joint sealing compositions of the present invention all contain, as essential ingredients, asphalt or equivalent cementitious base material, preferably from the class of bituminous substances; naturally occurring colloidal clay of a type hereinafter specified; and a dispersing agent, or agents, of the type hereinafter disclosed. In addition, they normally contain an oily ingredient, such as a residual oil, for purposes which will be explained hereinafter and they frequently contain a reinforcing filler, as, for example, asbestos, to impart strength and stability against cracking to the final sealing compound. The joint sealers of the present invention may contain, in addition to the abovementioned materials, various ingredients of a minor or supplementary nature, or components which have become assimilated as a result of the particular mode of processing as, for example, is normally the case when employing asphalt in the form of an emulsion or a cut-back mixture. It should be pointed out that in some cases certain components which are present in our freshly prepared sealing compounds are not permanently essential thereto. Examples of such non-essential components might be certain solvents such as those incorporated as a result of employing cut-back asphalt mixtures; solvents which are present in our freshly prepared sealing compounds sometimes substantially volatilize therefrom prior to utilization of said compounds and sometimes after utilization thereof.

We have discovered that joint sealing compositions prepared as taught herein are substantially free from sag at the elevated temperatures to which they must be subjected in use and that they can be economically prepared by commercial operations well-known to those in the art. These sealing compositions, moreover, can be applied after no, or at least a minimum of, preliminary heat softening treatment. Thus the material can readily be applied to automotive weld seams with a calking gun or the like, and when it is intended for application to pavement joints no preheating, such as is required for conventional bituminous fillers with or without sand or mineral filler, is necessary.

It is thus a principal object of the present invention to provide improved joint sealing compositions, suitable for application after no preliminary heat softening treatment, which resist softening and sag at elevated temperatures.

It is another object of the invention to provide improved joint sealing compositions for use in automotive weld seams which substantially resist sag when subjected to paint baking temperatures up to about 400° F. after application.

It is still another object of the invention to provide improved pavement joint fillers which can be applied without previous heat softening treatment and which are non-flowing at 140° F.

It is still another object of the invention to furnish a process for preparing the improved joint sealing compounds of said invention.

Other objects and features of the invention will be readily apparent from the complete description (with accompanying examples) thereof which follows.

It is, of course, within the scope of our invention to preheat our improved joint sealing compositions, to soften them to a certain extent, prior to application thereof. While such preheating does, in many cases, have a softening effect on said compositions, and thus makes them easier to apply, such softening is not accompanied by sagging. Although not wishing to be bound by any postulated theory as to the physical character of our novel joint sealing compositions, it appears to be the case that such a composition is reinforced by an internal gel-like structure, probably attributable to the dispersed clay therein, which prevents sag even when the cementitious component of said composition is heated to a temperature sufficiently high to soften it.

In preparing the joint sealing compositions of our invention, the preferred procedure is to colloidally disperse the clay component in a suitable organic liquid to form a thickened gel-like mass and then to mix this gel-like mass with the cementitious material to produce the final sealing compound.

Where the cementitious material is asphaltic in nature, the preferred organic liquids from which to form the clay-thickened masses are the so-called plasticizing oils of the asphalt industry. Plasticizing oils are liquid to semi-solid products of petroleum processing such as, for example, the residual oils from the destructive distillation of non-asphaltic petroleums or from the distillation of semi-asphaltic or asphaltic petroleums. Plasticizing oils are commonly used by manufacturers of asphaltic products as fluxes, i.e., they are mixed with asphaltic materials which are too hard for specific purposes to soften or "plasticize" them to desired consistencies.

Many other organic liquids are also suitable media in which to disperse the clay prior to its final compounding with the cementitious material. For example, solvents such as petroleum naphthas are useful for this purpose, as are asphalt cut-backs (liquid mixtures containing asphalt and solvent and, usually, a plasticizing oil), particularly where the cementitious ingredient is a bituminous substance. Needless to say, there are countless scores of organic liquids and mixtures thereof which would serve applicants' purpose and thus fall within the scope of the present invention. Therefore, since it would be virtually impossible to attempt recitation of all suitable organic liquids, suffice it to say that these liquids should be possessed of such properties as to permit colloidal dispersion of applicants' clay therein and to blend relatively easily with the cementitious component; moreover, they should impart substantially no undesirable characteristics to the final product, as for example, lowered water resistance or lowered resistance to sag at elevated temperatures.

As our colloidal clay component, any naturally occurring clay which has a surface area, after drying to a temperature of 350° F., of 50 square meters per gram or more, and preferably 100 square meters per gram or more, may be used. By surface area, as mentioned above, is meant that surface area which is determined by a nitrogen adsorption method described by S. Brunauer, P. H. Emmet, and E. Teller in their article entitled "Adsorption of Gases in Multi-Molecular Layers," on page 309 of Journal of the American Chemical Society, vol. 60, February 1938, using the molecular size data of H. K. Livingston presented in his article entitled "Cross-Sectional Areas of Molecules Adsorbed on Solid Surfaces," on page 569, Journal of the American Chemical Society, vol. 66, April 1944. The clays particularly adaptable in the process of the present invention are the sub-bentonites which are a class of non-swelling montmorillonite clays, nontronite, illite, hectorite, beidellite, saponite, halloysite, and attapulgite. The surface area of the above-identified clays are all in excess of 50 square meters per gram. Attapulgite, which we have found to be particularly suitable in the practice of our invention, possesses a surface area, as measured by the above-identified method, of from about 120 to about 140 square meters per gram.

We particularly prefer to use, as our colloidal clay component, attapulgite which has been refined to a substantially grit-free state. Although attapulgite clay, as mined, can be used in our novel sealer, obviously a better quality product can be expected when attapulgite is employed from which undispersed clay agglomerates, fine quartz, other foreign matter, etc. have been partially or substantially removed. We have discovered that for best results attapulgite having a free moisture content within the range from about 5 to about 30 percent should be used. By free moisture content as the term is used above, is meant that moisture in the clay which can be removed by drying said clay to a constant weight at a temperature of 220° F., this amount of moisture being expressed as the percent of the total clay weight. Attapulgite clays which we have found to be suitable for the present invention are Permagel, a purified colloidal attapulgite, and Attasorb HVM, a fluid-energy ground attapulgite product, both of which are produced by Mineral & Chemicals Corporation of America. Permagel, as produced, contains a free moisture content of about 27 percent. Although Permagel can be used without modification in our invention, we have discovered that when it is predried to a lower moisture content, as for example to a free moisture of about 11.5 percent, it is even more advantageous for use as the colloidal clay component of our improved joint sealing compositions.

In order to form the thickened colloidal dispersion of the clay in the organic liquid, it is necessary to subject a mixture of the clay and liquid along with a suitable dispersing agent of a type hereinafter disclosed, to shearing agitation under high shear conditions as, for example, by treatment in a roller mill, a colloid mill, a homogenizer, or equivalent apparatus. The order in which the colloidal clay, dispersing agent and organic liquid are mixed is immaterial. Thus, the dispersing agent and organic liquid may be mixed first followed by the addition and mixing in of the clay; the clay and organic liquid may be mixed first and then the dispersing agent incorporated; or all three components may be mixed simultaneously.

The dispersing agents which we have found most suitable for our purposes are the surface-active, oil-dispersible, water-insoluble, imidazolines which are the reaction products of fatty acids and N-substituted ethylene diamines conforming to the general structure:

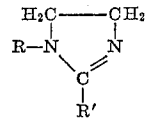

where R, the N substituted substituent, can be an alkylol group containing from 2 to 18 carbon atoms, a radical containing an amino group and having from 2 to 18 carbon atoms, or an alkyl or alkylene group containing from 2 to 18 carbon atoms, and R' can be an alkyl or alkylene group of from 11 to 21 carbon atoms. Typical examples of the dispersing agents suitable for our purpose are Amine O, a product of Alrose Chemical Company, prepared by reacting oleic acid and amino ethyl ethanolamine; Amine S (Alrose Chemical Company), prepared from stearic acid and amino ethyl ethanolamine; Amine C (Alrose Chemical Company), prepared from lauric acid and amino ethyl ethanolamine; and Amine 220, a product manufactured by Carbide & Carbon Chemicals Company which is believed to be similar to Amine O. Amine O has been identified as 1-β-hydroxyethyl-2-heptadecenyl imidazoline. Mixtures of imidazolines can, of course, be employed in the process of our invention within the scope of said invention.

We have discovered, after much experimentation, that the aforesaid imidazolines are superior dispersing agents for our clays, and particularly for our preferred attapulgite clays, which latter would be substantially undispersible in the organic liquids suitable for our purpose without the aid of an efficient and economical dispersing agent. We have found imidazolines, of the above-disclosed class, to be excellent and relatively inexpensive dispersing agents for our clays, and, in addition, we have found that they possess the added advantage of cooperating to produce final joint sealing compounds of excellent water resistance and anti-sagging (at elevated temperatures) tendencies. Consequently, the use of imidazolines as dispersing agents in our process is considered to be an important and critical part of said process and essential thereto. However, although we wish to make it clear that the use of the aforesaid imidazolines as dispersing agents in our process is essential thereto, we wish to make it equally clear that other suitable dispersing agents may be employed in conjunction with said imidazolines (but not in place of them) if desired. Dispersing agents suitable for use in our process in conjunction with the imidazolines should preferably be compatible with said imidazolines and they should not contribute substantially to lowered water resistance, or detract substantially from the anti-sag properties, of the joint sealing compounds.

It is not necessary to employ high shear when mixing the thickened organic liquids with the cementitious materials to produce the final sealing compounds of our invention. Any conventional form of stirring, mixing or kneading apparatus well known to those in the art will suffice for this operation.

Various ingredients for the purpose of improving or adjusting certain properties of the mix or of the final composition can, of course, be incorporated into the mixture at any stage of the process within the scope of the invention. Thus, asbestos or other fibrous material may be added as a reinforcing filler or a thermal stabilizing agent, as for example pentaerythritol, may be added if desired. Plastizers, anti-freeze materials, and many other types of substances can be included in the formulation if these are deemed necessary or desirable. The consistency or workability of the mix can be adjusted to a desired level by the addition of compatible liquids such as solvents or plasticizing oils. Heat may be employed in this step of the process if desired.

As previously disclosed, the preferred cementitious materials for our purpose are the class of such materials which are bituminous in nature as exemplified by the asphalts, tars, and pitches from natural sources or derived from petroleum, coal, wood, etc. Petroleum asphalts are our preferred cementitious materials and these can be employed in our process as asphalt-plasticizing oil mixtures (so called 100 percent solids asphalts), as asphalt cutbacks (asphalt-solvent mixtures, usually containing plasticizing oils as well), or as asphalt emulsions (usually emulsions of water and 100 percent solids asphalt); it is obvious from this that, when a bituminous substance, such as a petroleum asphalt, is employed as the cementitious base material of our novel joint filling composition, said composition will, as a result, have incorporated therein a certain amount of a plasticizing oil, which amount will be at least equivalent to that present in the original bituminous material. Other cementitious base materials which may be employed in our joint filling compounds are resins of the type referred to as coatings resins. Thus, suitable resins for our purpose may be natural resins, as for example, rosins, copals, batus, etc.; synthetic resins (which may be straight or modified), as for example, alkyd resins, phenolic resins, etc.; and latex type resins, as for example, polystyrene, butadiene-acrylonitrile copolymers, polyvinyl acetate, chlorinated rubber, etc. It is, of course, within the scope of our invention to employ mixtures of bituminous materials and coatings resins in our novel joint filling compounds.

Although we prefer to process our sealing compounds as indicated previously herein, i.e., by first preparing a thickened clay-organic liquid mixture by high shear means and then mixing the thickened mass with asphalt or other cementitious material, it is also possible to mix all of the ingredients together simultaneously by high shear means to obtain our novel product.

In the preferred method of preparing our novel joint sealing compounds the proportions of thickened organic liquid and cementitious material, particularly where asphalt is the cementitious component and plasticizing oil the organic liquid, should preferably run from about 30 to about 50 percent for the thickened liquid and from about 50 to about 70 percent for the cementitious containing component including any reinforcing filler or fillers. When a reinforcing filler, as, for example, asbestos, is used it should preferably be present in the final compound in amount equivalent to from about 5 to about 25 percent of the total weight.

We have discovered that the optimum proportions of ingredients for the thickened organic liquids are from about 1 to about 25 percent by weight of colloidal clay on a volatile-free weight basis (volatile-free weight being the weight of the clay after heating for about half an hour at from 1700° to 1800° F.) and from about ½ to about 10 percent by weight of dispersing agent, with the remainder comprising the organic liquid.

On a total weight basis the proportions by weight of the principal ingredients of our joint sealing compounds should, for best results, be substantially as follows: from about 25 to about 70 percent cementitious base material; from about 0.3 to about 12.5 percent colloidal clay, on a volatile-free weight basis; a minor amount, i.e. less than 50 percent, of organic liquid such as that in which the clay is dispersed in our preferred method of preparing said joint sealing compounds; and from about 0.15 to about 5.0 percent imidazoline dispersing agent or agents.

Following are examples of the practicing of certain embodiments of our invention included for purposes of illustration only. It should be clearly understood that the invention is not limited to these illustrative embodiments since many other embodiments exist within its scope.

*Example I*

In this example, a colloidal dispersion of attapulgite in plasticizing oil was prepared as an initial step in the formation of an asphaltic automotive weld sealer.

A mixture consisting of 82.4 percent by weight of a plasticizing oil, 11.9 percent colloidal attapulgite (predried Permagel) containing about 11.5 percent free moisture, 2.1 percent Amine O, 2.1 percent G–3835 (a surface-active dispersing agent, which is an additive product of stearylamine and ethylene oxide, manufactured by Atlas Powder Company), and 1.5 percent Pentek, to aid in the thermal stabilization of the product (Pentek is a technical grade of pentaerythritol made by Heyden Chemical Corporation), was preheated to about 200° F. and thickened by one passage through a Tri-Homo colloid mill. The colloid mill was operated at a rotor speed of 10,000 r.p.m. and a rotor clearance of 0.0015 in.; the feed rate was one and a half gal./hr. The maximum temperature attained by the mixture during this operation was 275° F. The Tri-Homo colloid mill is well-known in the art and accordingly need not be further described here.

The thickened dispersion of attapulgite clay in the plasticizing oil was tested for thermal stability by measuring its consistency before and after heating it in an oven for half an hour at 400° F. The method employed for measuring the consistency was a modification of the ASTM cone penetration test, designated as D 217–52T, in which a cone half the size of that recommended was used. This modified ASTM test is generally referred to in the art as the half cone penetration test; the half cone used in this modified ASTM method is described in an article in Analytical Chemistry, 22, 1574–75 (1950) by Hotten and Kibler.

In the half cone penetration test, a metal cone of specified dimensions is permitted to sink into the material being tested, as described in ASTM Test D 217–52T, and the depth to which it sinks, reported in tenths of millimeters, is taken as a measure of the consistency of the sample.

The half cone penetration results on the thickened clay dispersion of this example are below.

| Sample | Half Cone Penetrations |
| --- | --- |
| Sample as produced | 141 |
| Same sample after heating at 400° F | 139 |
| Heated sample after spatula working | 139 |

The above results show that the thickened dispersion was possessed of excellent thermal stability since the penetration of the half cone was no greater, in fact slightly less, in the oven-heated dispersion than in the dispersion as prepared. The aforesaid heat treatment was a particularly rigorous test of thermal stability in view of the relatively high temperature employed.

The working of the sample, prior to the final half cone measurement, was performed with a spatula as indicated in the table.

The final automotive joint sealing compound is prepared from the thickened dispersion by mixing it, using any conventional stirrer or mixer, with a suitable bituminous substance. By mixing said dispersion with an asphalt-plasticizing oil mixture and incorporating a reinforcing filler, an automotive weld sealer having excellent resistance to sag at temperatures up to 400° F. is prepared. Such a sealing compound is plastic enough at relatively low temperatures, such as normal room temperatures, for application with no preheating being required. In addition, the sealing compound has substantially no tendency to bleed through paint films of the type applied to automobiles.

The flow resistance, or resistance to sag, of the sealer at 400° F. is determined by applying a 3/32 in. extruded bead of said sealer into a spot welded assembly with a clearance of 0.200 in. and then leaving the assembly in an oven maintained at 400° F. for a period of 2 hours; for the sealer to be adequately resistant to sag at this temperature there should be no flow-out of said sealer from the seam.

*Example II*

This was similar to Example I except that the mixture of predried Permagel, plasticizing oil, surface-active agents and Pentek was passed through the Tri-Homo colloid mill four times and said mixture was not preheated prior to this milling procedure. The rotor clearance for two of the passes was 0.002 in. and for the other two passes it was 0.0005 in. The maximum temperature of the mixture during milling was 315° F.

Half cone penetration results on the resulting thickened dispersion are below.

| Sample | Half Cone Penetrations |
| --- | --- |
| Sample as produced and spatula worked | 158 |
| Same sample after heating 1/2 hr. at 400° F | 148 |
| Heated sample after spatula working | 153 |

Here again, as in Example I, the penetration results show that the dispersion was possessed of excellent thermal stability. Said dispersion is combined with a bituminous material to make an automotive weld sealer exhibiting substantially no tendency to sag at paint baking temperatures.

*Example III*

This is an example similar to Example I except that a different plasticizing oil was used and the rotor clearance was only 0.0005 in. during the milling operation. The maximum temperature of the mixture during milling was 290° F.

Half cone penetration results on the thickened dispersion are below.

| Sample | Half Cone Penetrations |
| --- | --- |
| Sample as produced and spatula worked | 152 |
| Same sample after heating 1/2 hr. at 400° F | 151 |
| Heated sample after spatula working | 146 |

The above results show that the dispersion was possessed of excellent thermal stability, as were the dispersions of Examples I and II. Said dispersion is combined with a bituminous material, according to the teachings herein, to make an automotive weld sealer having substantially no tendency to sag at paint baking temperatures.

*Example IV*

This is an example similar to Example III except that the mixture of predried Permagel, plasticizing oil, surface-active agents and Pentek was passed through the Tri-Homo colloid mill four times instead of only once and and it was not preheated prior to the milling procedure. The maximum temperature of the mixture during milling was 315° F.

Half cone penetration readings on the resulting thickened dispersion are below.

| Sample | Half Cone Penetrations |
| --- | --- |
| Sample as produced and spatula worked | 164 |
| Same sample after heating 1/2 hr. at 400° F | 151 |
| Heated sample after spatula working | 148 |

The above results show that the dispersion of the present example, as did those of the previous examples, had excellent thermal stability. The dispersion is combined with a bituminous cementitious material, as taught herein, to produce an automotive sealer capable of enduring paint baking temperatures with substantially no accompanying tendency to sag.

*Example V*

In this example, an asphalt cut-back was thickened by dispersing predried Permagel (of 11.5 percent free moisture) therein with the aid of Amine O as the surface-active dispersing agent. The asphalt cut-back was an asphaltic mixture containing 45 percent of a low boiling naphtha (having an initial boiling point of 130° F.) as the solvent thinner. The proportions of asphalt cut-back, Permagel and Amine O were 84.8, 12.0 and 3.2 percent respectively.

In preparing the thickened cut-back mixture the ingredients were passed through a Tri-Homo colloid mill, operated at a rotor speed of 10,000 r.p.m. and a rotor clearance of 0.001 in., three times. The feed rate through the mill was 4 gal./hr. and the maximum temperature attained by the mixture during milling was 142° F.

The dispersion resulting from the above-described procedure is mixed with an asphaltic component to form an automotive weld sealer having substantially no tendency to sag at paint baking temperatures.

*Example VI*

This is an example of the preparation of an asphaltic pavement joint filler.

A sample of attapulgite-thickened plasticizing oil was prepared by passing a mixture of plasticizing oil, attapulgite and Amine O once through a Tri-Homo colloid mill. The attapulgite employed was Attasorb HVM (which contained 9.0 percent free moisture). The proportions of Attasorb HVM and Amine O were 15 percent (on a volatile-free weight basis) and 4.5 percent, respectively. The Tri-Homo mill was operated at a rotor speed of 10,000 r.p.m. and a rotor clearance of 0.002 inch.

The thickened dispersion of attapulgite in plasticizing oil was mixed with asphalt and rubber components to produce a pavement joint filler which was tested and found to exhibit good non-flowing properties at 140° F., and even higher temperatures; the material was also found to possess good low temperature cohesion and mobility.

*Example VII*

This is another example of the preparation of an asphaltic pavement joint filler.

This example is similar to Example VI except that the quantities of Attasorb HVM and Amine O were higher and the Tri-Homo mill was operated at a lower rotor speed (7,000 r.p.m.) and a greater rotor clearance (0.004–0.005 in.). The proportions of Attasorb HVM and Amine O in this example were 20 and 6 percent, respectively.

Here, as in Example VI, the thickened dispersion was mixed with asphalt and rubber components to produce a pavement joint filling composition of good non-flowing properties at 140° F. and higher, as well as good low temperature mobility and cohesion.

Example VIII

This is an example of the preparation of an automotive sealing compound in which the cementitious component is an alkyd resin.

A mixture of alkyd resin with mineral spirits thinner, Permagel (containing about 28 percent free moisture), and cationic surface-active agent was prepared by stirring the ingredients for 15 minutes in a laboratory Turbomixer, the alkyd resin being Beckosol P–470–70, a phthalic soya resin product of Reichhold Chemicals, Inc. containing 30 percent mineral spirits as a thinner and the surface-active agent being Amine C, which is, as previously disclosed, a product of Alrose Chemical Company comprising the reaction product of lauric acid and amino ethyl ethanolamine. The proportions of ingredients were 84.74 percent Beckosol P–470–70, 11.97 percent Permagel, and 3.29 percent Amine C.

The stirred mixture from the Turbomixer was passed once through a Tri-Homo colloid mill operated at a rotor speed of 10,000 r.p.m. and a rotor clearance of 0.002 in. to form the final sealing compound.

The sealing compound was tested for thermal stability by applying a thick drawdown thereof to a brass panel, placing the panel in a near-vertical position in an oven, leaving the panel in the oven for three hours during which said oven was maintained at a temperature of 300° F., and, finally, observing the condition of the drawdown after the oven heating treatment. The sealing compound was observed to be free of sagging or melting tendencies as a result of this test.

Thus a thermally stable alkyd resin automotive sealing compound has been shown to be attainable by the process of our invention.

Example IX

This example was identical to Example VIII except that the mixture was passed through the Tri-Homo mill twice. Here again, as in Example VIII, the sealing compound stood up under the oven heating test with no sagging or melting.

Example X

This example was identical to Examples VIII and IX except that the mixture was passed through the Tri-Homo mill five times. The product withstood the oven heating at 300° F. with no sagging or melting.

Example XI

The procedure of this example was identical to that of Example X except that the mixture, after the last Tri-Homo mill pass, was cut back with 15 percent (of the weight of the mixture after milling) mineral spirits to alter its consistency. The mixing of sealer and mineral spirits was accomplished by stirring the components for 15 minutes in a Hamilton Beach food mixer.

The cut-back sealer was tested for thermal stability by the oven heating method described in Example VIII and found to exhibit no sagging or melting at 300° F.

The present example illustrates the ease with which the consistency of the sealers of the present invention can be adjusted to a desired level.

We claim:

1. A composition for filling joints, which is substantially free from sag at elevated temperatures consisting essentially of from about 25 to about 70 parts by weight of bitumen; an amount less than about 50 parts by weight of a plasticizing oil; from about 0.3 to about 12.5 parts by weight of a naturally occurring colloidal clay having a surface area of at least 50 square meters per gram, colloidally dispersed therein; and from about 0.15 to about 5.0 parts by weight of an imidazoline of the following structural formula:

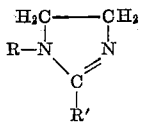

where R is selected from the group consisting of alkylol groups containing from 2 to 18 carbon atoms, radicals containing an alkyl amino group and having from 2 to 18 carbon atoms, and alkyl and alkylene groups containing from 2 to 18 carbon atoms, and R' is selected from the group consisting of alkyl and alkylene groups of from 11 to 21 carbon atoms.

2. A composition for filling joints, which is substantially free from sag at elevated temperatures consisting essentially of from about 25 to about 70 parts by weight of bitumen; an amount less than about 50 parts by weight of a plasticizing oil; from about 0.3 to about 12.5 parts by weight of a naturally occurring colloidal clay having a surface area of at least 50 square meters per gram, colloidally dispersed therein; and from about 0.15 to about 5.0 parts by weight of an imidazoline of the following structural formula:

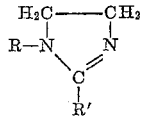

where R is selected from the group consisting of alkylol groups containing from 2 to 18 carbon atoms, radicals containing an alkyl amino group and having from 2 to 18 carbon atoms, and alkyl and alklyene groups containing from 2 to 18 carbon atoms, and R' is selected from the group consisting of alkyl and alkylene groups of from 11 to 21 carbon atoms, and from about 5 to about 25 parts by weight of a reinforcing filler.

3. The composition of claim 1 in which the bitumen is petroleum asphalt.

4. The composition of claim 1 in which the imidazoline is 1-β-hydroxyethyl-2-heptadecenyl imidazoline.

5. The composition of claim 1 in which the naturally occurring colloidal clay is attapulgite.

6. A composition for filling joints, which is substantially free from sag at elevated temperatures consisting essentially of from about 25 to about 70 parts by weight of bitumen; an amount less than about 50 parts by weight of a plasticizing oil uniformly mixed with said bitumen; from about 0.3 to about 12.5 parts by weight of attapulgite, on a volatile-free weight basis, colloidally dispersed therein; and from about 0.15 to about 5.0 parts by weight of an imidazoline of the following structural formula:

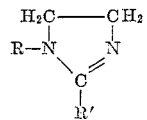

where R is selected from the group consisting of alkylol groups containing from 2 to 18 carbon atoms, radicals containing an alkyl amino group and having from 2 to 18 carbon atoms, and alkyl and alkylene groups containing from 2 to 18 carbon atoms, and R' is selected from the group consisting of alkyl and alkylene groups of from 11 to 21 carbon atoms.

7. The composition of claim 2 in which the reinforcing filler is asbestos.

8. A composition for filling joints, which is substantially free from sag at elevated temperatures consisting essentially of from about 25 to about 70 parts by weight of bitumen; an amount less than about 50 parts by weight of a plasticizing oil; from about 0.3 to about 12.5 parts by weight of attapulgite clay, colloidally dispersed therein; an amount less than about 50 parts by weight of a plasticizing oil uniformly mixed with said bitumen; and from about 0.15 to about 5.0 parts by weight of 1-β-hydroxyethyl-2-heptadecenyl imidazoline.

9. A process for preparing a joint filling composition which is substantially free from sag at elevated temperatures, comprising forming a mixture of from about 0.3 to about 12.5 parts by weight of attapulgite; an amount less than about 50 parts by weight of a plasticizing oil; from about 0.15 to about 5.0 parts by weight of an imidazoline having the following structural formula:

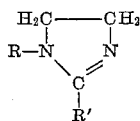

where R is selected from the group consisting of alkylol groups containing from 2 to 18 carbon atoms, radicals containing an alkyl amino group and having from 2 to 18 carbon atoms, and alkyl and alkylene groups containing from 2 to 18 carbon atoms, and R' is selected from the group consisting of alkyl and alkylene groups of from 11 to 21 carbon atoms; subjecting said mixture to high shear milling to disperse said clay in said plasticizing oil thereby forming a heat-stable, gel-like material; and then mixing said resulting gel-like material with from about 25 to about 70 parts by weight of bitumen.

10. The process of claim 9 in which the imidazoline is 1-β-hydroxyethyl-2-heptadecenyl imidazoline.

11. A process for preparing a joint filling composition which is substantially free from sag at elevated temperatures, comprising essentially forming a mixture of from about 0.3 to about 12.5 parts by weight of attapulgite containing from about 5 to about 30 percent free moisture, an amount less than about 50 parts by weight of a plasticizing oil; from about 0.15 to about 5.0 parts by weight of an imidazoline having the following structural formula:

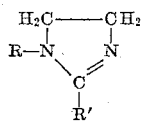

where R is selected from the group consisting of alkylol groups containing from 2 to 18 carbon atoms, radicals containing an alkyl amino group and having from 2 to 18 carbon atoms, and alkyl and alkylene groups, containing from 2 to 18 carbon atoms, and R' is selected from the group consisting of alkyl and alkylene groups of from 11 to 21 carbon atoms; subjecting said mixture to high shear milling to disperse said clay in said plasticizing oil thereby forming a heat-stable, gel-like material; and then mixing said resulting gel-like material with from about 25 to about 70 parts by weight of bitumen and from about 5 to about 25 parts by weight of a reinforcing filler.

12. A process for preparing a joint filling composition which is substantially free from sag at elevated temperatures, comprising essentially forming a mixture of from about 1 to about 25 percent by weight of attapulgite on a volatile-free weight basis, said attapulgite containing from about 5 to about 30 percent free moisture; a plasticizing oil; from about 0.5 to about 10 percent by weight of 1-β-hydroxyethyl-2-heptadecenyl imidazoline; subjecting said mixture to high shear milling to form a heat-stable, gel-like material; and mixing the resulting gel-like material with petroleum asphalt in a proportion of from about 30 to about 50 percent by weight of the total composition.

13. A process for preparing a joint filling composition which is substantially free from sag at elevated temperatures, comprising essentially forming a mixture of from about 0.3 to about 12.5 parts by weight of attapulgite; from about 25 to about 70 parts by weight of bitumen, an amount less than about 50 parts by weight of a plasticizing oil; and from about 0.15 to about 5.0 parts by weight of an imidazoline having the following structural formula:

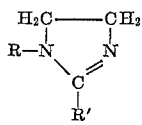

where R is selected from the group consisting of alkylol groups containing from 2 to 18 carbon atoms, radicals containing an alkyl amino group and having from 2 to 18 carbon atoms, and alkyl and alkylene groups containing from 2 to 18 carbon atoms, and R' is selected from the group consisting of alkyl and alkylene groups of from 11 to 21 carbon atoms; and subjecting said mixture to high shear milling to thereby accomplish colloidal dispersion of said clay in said bitumen.

References Cited in the file of this patent

UNITED STATES PATENTS

| 2,361,488 | Mikeska | Oct. 31, 1944 |
| 2,401,348 | Hauser et al. | June 4, 1946 |
| 2,433,910 | Johnson | Jan. 6, 1948 |
| 2,468,163 | Blair | Apr. 26, 1949 |
| 2,546,659 | Sussenbach | Mar. 27, 1951 |
| 2,727,832 | Christensen et al. | Dec. 20, 1955 |
| 2,757,160 | Anderson | July 31, 1956 |
| 2,766,132 | Blair | Oct. 9, 1956 |

FOREIGN PATENTS

| 578,694 | Great Britain | July 9, 1946 |

UNITED STATES PATENT OFFICE
CERTIFICATE OF CORRECTION

Patent No. 2,894,848                            July 14, 1959

Manfred E. Goodwin et al.

It is hereby certified that error appears in the printed specification of the above numbered patent requiring correction and that the said Letters Patent should read as corrected below.

Column 3, lines 73 and 74, for "Mineral & Chemicals Corporation of America" read -- Minerals & Chemicals Corporation of America --; column 6, line 27, for "G-3835" read -- G-3825 --.

Signed and sealed this 1st day of March 1960.

(SEAL)
Attest:

KARL H. AXLINE                                        ROBERT C. WATSON

Attesting Officer                                      Commissioner of Patents